United States Patent [19]

Takemoto et al.

[11] Patent Number: 4,590,522
[45] Date of Patent: May 20, 1986

[54] APPARATUS FOR RECORDING AND REPRODUCING A DIGITAL INFORMATION SIGNAL WITH DIFFERENT SAMPLING FREQUENCIES

[75] Inventors: Sohei Takemoto; Masato Nakamura, both of Kanagawa, Japan

[73] Assignee: Sony Corporation, Tokyo, Japan

[21] Appl. No.: 487,770

[22] Filed: Apr. 22, 1983

[30] Foreign Application Priority Data

Apr. 23, 1982 [JP] Japan .................. 57-69429

[51] Int. Cl.[4] ............................................. H04N 5/782
[52] U.S. Cl. ................................... 358/321; 358/338; 358/339; 360/32; 360/51
[58] Field of Search ............... 358/310, 320, 321, 337, 358/338, 339, 138; 360/32, 51; 369/47, 50

[56] References Cited

U.S. PATENT DOCUMENTS 4,133,009 1/1979 Kittler et al. .................. 358/320 X
4,348,699 9/1982 Tsuchiya et al. .................... 360/32

Primary Examiner—Robert L. Richardson
Attorney, Agent, or Firm—Lewis H. Eslinger; Alvin Sinderbrand

[57] ABSTRACT

A video tape recorder for recording and reproducing a color video signal on a magnetic tape with different amounts of recording and reproducing time, includes a capstan drive assembly for advancing the magnetic tape; a recording section including A/D converters for converting the color video signal into digital form such that the digitized color video signal has a recording sampling frequency associated therewith, an encoder for encoding the digitized color video signal at a recording operating frequency, and rotary magnetic heads for recording the encoded signal on the magnetic tape; a reproducing section including rotary magnetic heads for reproducing the encoded signal from the magnetic tape, a decoder for decoding the reproduced encoded digitized color video signal at a reproducing operating frequency to produce a digitized color video signal having a reproducing sampling frequency associated therewith, and digital-to-analog converters for converting the digitized color video signal from the decoder into analog form; and a control device for controlling changes in the speed of rotation of the recording heads, the recording speed of the magnetic tape and the recording operating freuency of the encoder with the same ratio $\alpha$ such that the recording sampling frequency changes with the same ratio $\alpha$ and for controlling changes in the speed of rotation of the reproducing heads, the reproducing speed of the magnetic tape and the reproducing operating frequency of the decoder with the same ratio $\beta$ such that the reproducing sampling frequency changes with the same ratio $\beta$.

16 Claims, 6 Drawing Figures

APPARATUS FOR RECORDING AND REPRODUCING A DIGITAL INFORMATION SIGNAL WITH DIFFERENT SAMPLING FREQUENCIES

BACKGROUND OF THE INVENTION

This invention relates generally to information signal recording and reproducing apparatus and, more particularly, is directed to a video tape recorder which provides different amounts of recording and reproducing time on a magnetic tape.

Video tape recorders (VTR) which record information signals, such as video and/or audio signals, on a magnetic tape which is contained within a cassette, are well-known in the art. With such VTRs, it has been proposed to provide different amounts of recording and reproducing time for the same length of magnetic tape within the cassette. In this regard, it has been proposed to use a hierarchy system of sampling frequencies for an information signal. For example, where the information signal is a color video signal having a luminance component and red and blue color difference signal components, the sampling frequencies of the luminance component, red color difference signal component and blue color difference signal component can be selected as $4f_0$, $2f_0$ and $2f_0$, where $4f_0$ is a predetermined frequency, for example, 13.5 MHz. In such case, the relationship between the sampling frequencies of the luminance component, red color difference signal component and blue color difference signal component is 4:2:2. In other words, for the 4:2:2 system, the sampling frequency of the color video signal is $8f_0$. If it is desired to reduce tape consumption and thereby increase the recording and reproducing time on the magnetic tape, the sampling frequencies of the luminance component and red and blue color difference signal components may be selected as $2f_0$, $f_0$ and $f_0$, respectively, that is, the relationship between the sampling frequencies is selected as 2:1:1. Thus, for the 2:1:1 system, the sampling frequency of the color video signal is $4f_0$. In such case, it is to be appreciated that the circuitry necessary for the 2:1:1 system need be less complicated than that for the 4:2:2 system, thereby reducing the cost of the apparatus. It is to be further appreciated that the speed of rotation of the rotary magnetic heads of the VTR, the speed of movement of the magnetic tape past the heads and the operating frequency of the processing circuitry generally varies with the hierarchy system utilized, that is, the 4:2:2 system, the 2:1:1 system and other systems. It is therefore to be appreciated that when the speed of movement of the magnetic tape changes so as to change the recording and reproducing time, similar changes should also occur with respect to the rotational speed of the magnetic heads, the operating frequency of the different circuitry, whereby to also change the sampling frequency of the information signal, for both recording and reproduction.

OBJECTS AND SUMMARY OF THE INVENTION

Accordingly, it is an object of this invention to provide apparatus for recording and reproducing an information signal that avoids the above-described difficulties encountered with the previously-proposed arrangement;

More particularly, it is an object of this invention to provide apparatus for recording and reproducing an information signal that can be used with different sampling frequencies;

It is another object of this invention to provide apparatus for recording and reproducing an information signal that provides different amounts of recording and reproducing time on a magnetic tape.

In accordance with an aspect of this invention, apparatus for recording and reproducing an information signal on a record medium, comprises drive means for moving the record medium; a recording section including recording converting means for converting the information signal into digital form such that the digitized information signal has a recording sampling frequency associated therewith, recording processing means for processing the digitized information signal at a recording operating frequency, and movable recording transducer means for recording the processed digitized information signal on the record medium as the latter is moved at a recording speed by the drive means; a reproducing section including reproducing transducer means for reproducing the processed digitized information signal from the record medium as the latter is moved at a reproducing speed by the drive means, movable reproducing processing means for processing the reproduced processed digitized information signal at a reproducing operating frequency to produce a digitized information signal having a reproducing sampling frequency associated therewith, and reproducing converting means for converting the digitized information signal from the reproducing processing means into analog form; and control means for controlling changes in the speed of movement of the recording transducer means, the recording speed of the record medium and the operating frequency of the recording processing means with the same ratio $\alpha$ such that the recording sampling frequency changes with the same ratio $\alpha$ and for controlling changes in the speed of movement of the reproducing transducer means, the reproducing speed of the record medium and the operating frequency of the reproducing processing means with the same ratio $\beta$ such that the reproducing sampling frequency changes with the same ratio $\beta$.

The above, and other, objects, features and advantages of the invention will become apparent from the following detailed description thereof which is to be read in connection with the accompanying drawings.

DETAILED DESCRIPTION OF A PREFERRED EMBODIMENT

Figure 1:
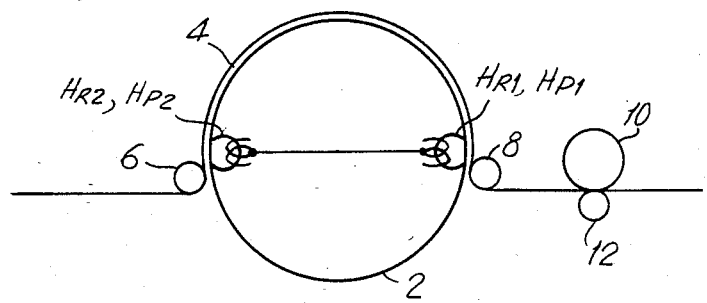
FIG. 1 is a schematic diagram of a rotary magnetic head assembly that can be used with the present invention.

Referring to the drawings in detail, and initially to FIG. 1 thereof, a rotary magnetic head assembly that can be used with the present invention includes a guide drum 2 about which a magnetic tape 4 is partially wrapped, tape 4 being guided around guide drum 2 by guide pins or rollers 6 and 8. Guide drum 2 may include a lower stationary drum and an upper rotary drum to which magnetic recording heads $H_{R1}$ and $H_{R2}$ are secured for rotation therewith so as to record information signals, such as video and/or audio signals on record tracks extending obliquely on magnetic tape 4 as the latter is advanced longitudinally thereof. Magnetic recording heads $H_{R1}$ and $H_{R2}$ are positioned diametrically opposite to each other, that is, 180° apart so as to trace alternate tracks on magnetic tape 4. In like manner, two reproducing magnetic heads $H_{P1}$ and $H_{P2}$ are also provided at positions corresponding to recording magnetic heads $H_{R1}$ and $H_{R2}$, respectively, on the upper rotary drum for tracing the same respective record tracks to reproduce the information signals recorded thereon. Alternatively, it is to be appreciated that the same magnetic heads may be used for both recording and reproduction. Magnetic tape 4 is advanced in its longitudinal direction around guide drum 2 by a capstan assembly comprised of a pinch roller 12, and a capstan 10 which is driven by a capstan motor (not shown) which, in turn, is controlled by a control circuit 60 (FIG. 2), the latter circuit also controlling the speed of rotation of the upper rotary drum and thereby the recording magnetic heads $H_{R1}$, $H_{R2}$ and reproducing magnetic heads $H_{P1}$, $H_{P2}$. Thus, as capstan 10 and pinch roller 12 move magnetic tape 4 in its longitudinal direction around guide drum 2, magnetic heads $H_{R1}$ and $H_{R2}$ rotate with the upper rotary drum of guide drum 2 so as to record the information signals in the record tracks extending obliquely on magnetic tape 4. It is to be noted that, although only two magnetic heads have been shown for recording and reproducing, any suitable number of magnetic heads may be used, for example, four magnetic heads or the like.

Figure 2:
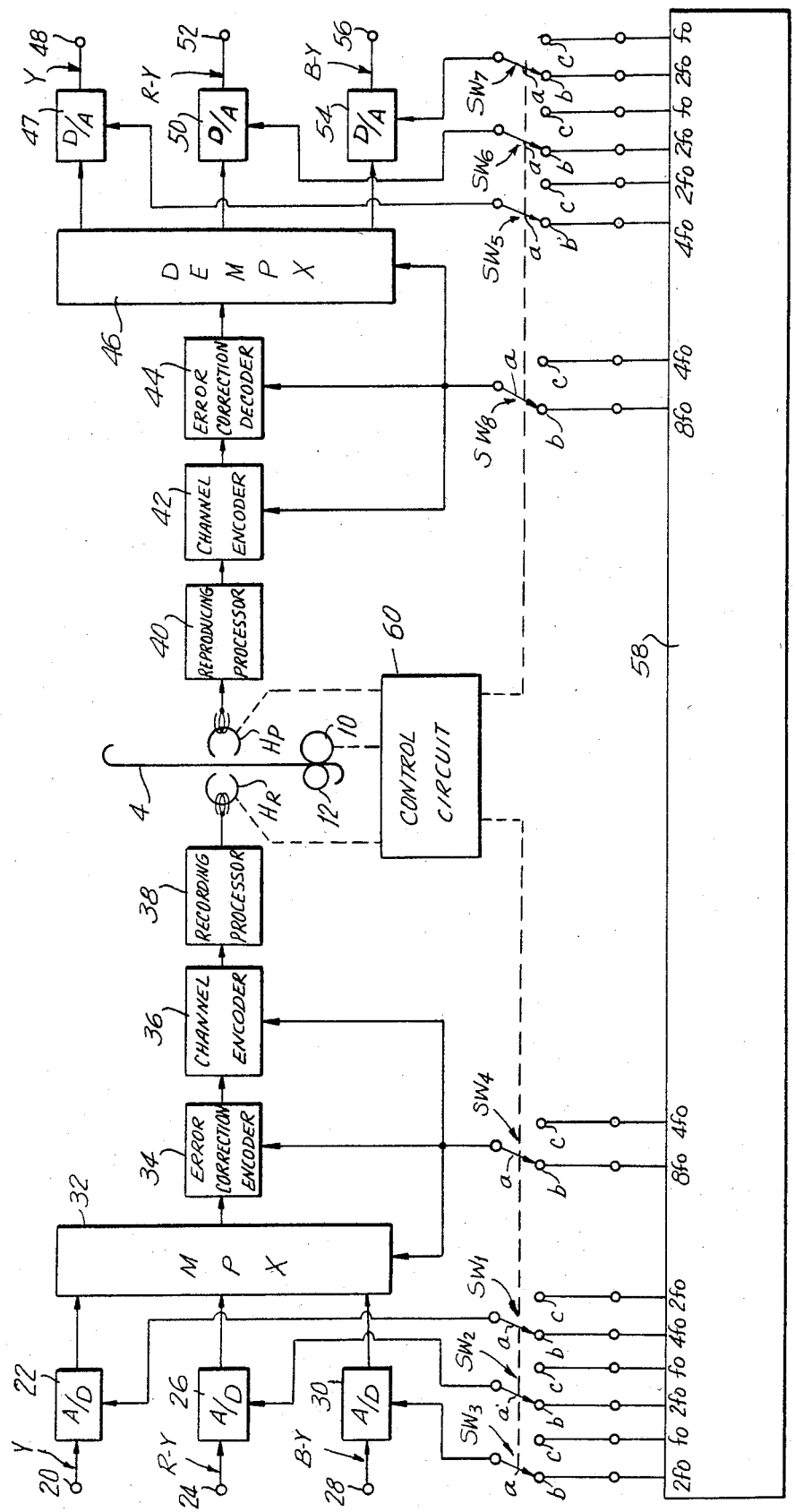
FIG. 2 is a block diagram of apparatus for recording and reproducing an information signal in accordance with one embodiment of the present invention.

Referring now to FIG. 2, apparatus according to one embodiment of the present invention will now be described with respect to a color video signal to be recorded. More particularly, the luminance component Y of the color video signal is supplied from an input terminal 20 to an analog-to-digital (A/D) converter 22 where it is sampled with a sampling frequency $A_1 f_0$ are converted into digital form. In like manner, the red color difference signal (R - Y) component is supplied through an input terminal 24 to an analog-to-digital (A/D) converter 26 which samples the red color difference signal component with a sampling frequency $A_2 f_0$. Also, the blue color difference signal ( B - Y) component is supplied through an input terminal 28 to another analog-to-digital (A/D) converter 30 which samples the blue color difference signal component with a sampling frequency $A_3 f_0$. It is to be appreciated that the luminance component Y generally contains more important information with respect to the picture information to be recorded than the red and blue color difference signal components, and accordingly, the luminance component Y is generally sampled with a sampling frequency which is equal to or greater than the sampling frequencies of the red and blue color difference signal components. The digitized signals from A/D converters 22, 26 and 30 are supplied to a multiplexer 32 to produce a multiplexed digital video signal which is divided into data blocks, with each data block having a block synchronizing signal added thereto. It is to be appreciated that the multiplexed digital color video signal has a sampling frequency associated therewith which corresponds to the sum of sampling frequencies of each of the individual components thereof. The multiplexed digital color video signal is supplied to an error correction encoder 34 which encodes each predetermined number of data blocks with error correcting codes and then supplies the multiplexed digital color video signal to a channel encoder 36 which distributes the encoded signal to two or more channels, that is, for each predetermined number of data blocks and error correcting codes appended thereto. For example, for the magnetic head assembly shown in FIG. 1, channel encoder 36 divides or separates the digital color video signal into two channels. On the other hand, for more than two magnetic heads, the digital color video signal may be divided into more than two channels. In any event, the digital color video signal in each channel from channel encoder 36 is supplied through a recording processor 38 to one recording magnetic head $H_R$. It is to be appreciated that only one recording processor 38 and recording magnetic head $H_R$ are shown in FIG. 2 to provide a simplified drawing for better explanation purposes, but that other recording processors 38 and magnetic heads $H_R$ are provided for the other channel or channels. Accordingly, the digital color video signal is recorded by magnetic heads $H_R$ in record tracks extending obliquely on magnetic tape 4.

During reproduction, a plurality of reproducing magnetic heads $H_P$ corresponding to the number of rotary magnetic heads $H_R$, trace the tracks extending on magnetic tape 4 to reproduce the digital color video signal recorded thereon. More particularly, each reproducing rotary magnetic head $H_P$ reproduces one channel of the digital color video signal which is then processed in a reproducing processor 40 and supplied to a channel decoder 42 which combines the plurality of channels to produce a single channel digital color video signal which is supplied to an error correction decoder 44. The latter circuit corrects any errors detected in the digital color video signal by means of error correcting codes added thereto by error correction encoder 34. If such errors are not correctable, error correction decoder 44 performs an error concealing operation. The error corrected digital color video signal from error correction decoder 44 is supplied to a demultiplexer 46 which separates the digital color video signal into the luminance component Y, the red color difference signal (R - Y) component and the blue color difference signal (B - Y) component. Then, the digitized luminance component Y is supplied to a digital-to-analog (D/A) converter 47 which converts the digitized luminance component Y into analog form and supplies the same to an output terminal 48. In like manner, the red color difference signal (R - Y) component is supplied to a digital-to-analog (D/A) converter 50 which converts the digitized signal into analog form and supplies the same to an output terminal 52. Also, the blue color difference signal (B - Y) component is supplied to a digital-to-analog (D/A) converter 54 which converts the digitized signal into analog form and supplies the same to an output terminal 56. It is to be appreciated, as with the recording section, although only one reproducing head $H_p$ and one reproducing processor 40 are shown in FIG. 2, a plurality of reproducing heads $H_p$ and reproducing processors 40 may be provided for a plurality of channels.

As shown in FIG. 2, a clock signal generator 58 is provided which generates clock signals with frequencies $8f_0$, $4f_0$, $2f_0$ and $f_0$ in response to a reference clock signal. For example, for a color video signal, the frequency $4f_0$ is selected as 13.5 MHz which is 854 times the horizontal frequency of an NTSC television signal and is 864 times the horizontal frequency of PAL and SECAM television signals. As an example, with the present invention, for the 4:2:2 system, the sampling frequencies of the luminance component Y, the red color difference signal (R - Y) component and the blue color difference signal (B - Y) component are respectively selected as $4f_0$, $2f_0$ and $2f_0$, while for the 2:1:1 system, the respective sampling frequencies are selected as $2f_0$, $f_0$ and $f_0$. It is to be appreciated that, in the 4:2:2 system, the sampling frequency of the entire digital color video signal from multiplexer 32 is equal to $8f_0$, while in the 2:1:1 system, the sampling frequency of the digital color video signal is equal to $4f_0$. Thus, the operating frequencies of encoders 34 and 36 must correspond to the sampling frequency of the color video signal. As shown in FIG. 2, in accordance with the present invention, switches $SW_1$, $SW_2$ and $SW_3$ are connected between clock signal generator 58 and A/D converters 22, 26 and 30, respectively, for supplying clock signals to the latter circuits having recording sampling frequencies $A_1f_0$, $A_2f_0$ and $A_3f_0$, respectively. For example, for recording with the 4:2:2 system, switches $SW_1$, $SW_2$ and $SW_3$ supply clock signals having frequencies $4f_0$, $2f_0$ and $2f_0$, respectively, to A/D converting circuits 22, 26 and 30, respectively. On the other hand, for recording with the 2:1:1 system, switches $SW_1$, $SW_2$ and $SW_3$ supply clock signals having frequencies $2f_0$, $f_0$ and $f_0$ to A/D converting circuits 22, 26 and 30, respectively. In this regard, each switch circuit includes a movable arm a and fixed terminals b and c supplied with clock signals for the 4:2:2 system and 2:1:1 system, respectively. In particular, terminal b of the switches are supplied with clock signals having frequencies $4f_0$, $2f_0$ and $2f_0$, respectively, for the 4:2:2 system, while terminal c of the switches are supplied with clock signals having frequencies $2f_0$, $f_0$ and $f_0$, respectively, for the 2:1:1 system. It is to be appreciated that, as previously discussed, for the 4:2:2 system, for the digital color video signal, the operating frequency of encoders 34 and 36 must correspond to the sampling frequency thereof. Thus, for the 4:2:2 system, the operating frequency is $8f_0$, while for the 2:1:1 system, the operating frequency is $4f_0$. In this regard, another switch $SW_4$ is provided having a movable arm a, a fixed terminal b supplied with a clock signal from clock signal generator 58 having a frequency $8f_0$, and a fixed terminal c supplied with a clock signal from clock signal generator 58 having a frequency $4f_0$. The output clock signal from switch $SW_4$ is supplied to multiplexer 32, error correction encoder 34 and channel encoder 36 for controlling the latter circuits at the operating frequency corresponding to the hierarchy system being utilized. It is to be appreciated that all of switches $SW_1$–$SW_4$ are ganged together, as shown by the dashed line in FIG. 2, such that the movable arms a of all of the switches contact terminals b thereof when operating in the 4:2:2 system and contact terminals c thereof when operating in the 2:1:1 system.

In like manner, for the reproducing section of FIG. 2, switches $SW_5$, $SW_6$ and $SW_7$ are provided for supplying clock signals having frequencies corresponding to the sampling frequency of the color video signal supplied to demultiplexer 46, to D/A converters 47, 50 and 54, respectively. More particularly, switches $SW_5$–$SW_7$ each include a movable arm a which is movable between two fixed terminals b and c for use in the 4:2:2 system and 2:1:1 system, respectively. Thus, when movable arms a are in contact with fixed terminals b thereof, clock signals having frequencies $4f_0$, $2f_0$ and $2f_0$ are supplied to D/A converters 47, 50 and 54, while clock signals having frequencies $2f_0$, $f_0$ and $f_0$ are supplied through switches $SW_5$–$SW_7$ to D/A converters 47, 50 and 54, respectively, when the movable arms a thereof are in contact with terminals c thereof. As with the recording section of FIG. 2, the reproducing section includes an additional switch $SW_8$ having a movable arm a which is movable between a fixed terminal b thereof supplied with a clock signal from clock signal generator 58 having a frequency $8f_0$ for use with the 4:2:2 system, and a fixed terminal c supplied with a clock signal from clock signal generator 58 having a frequency $4f_0$ for use with the 2:1:1 system. The clock signal from switch $SW_8$ is supplied to channel decoder 42, error correction decoder 44 and demultiplexer 46 as the operating frequency therefor, that is, corresponding to the sampling frequency of the digital color video signal through the reproducing section. It is to be appreciated that switches $SW_5$–$SW_8$ are ganged together, as shown by the dashed line in FIG. 2.

It is to be appreciated that the tape consumption for the 2:1:1 system is less than that for the 4:2:2 system. More particularly, because the sampling frequency of the color video signal for the 4:2:2 system is twice that for the 2:1:1 system, the data rate for each channel is greater in the 4:2:2 system than for the 2:1:1 system, thereby requiring more tape to record the same signal with the 4:2:2 system. In addition, it is to be noted that the speed of movement of magnetic tape 4 and the speed of rotation of the magnetic heads are greater in the 4:2:2 system. Accordingly, it is desirable to provide compatibility in each of the recording and reproducing sections when using different sampling frequencies. For example, if it is desired to reduce the tape consumption, the speed of movement of magnetic tape 4 and speed of rotation of the rotary magnetic heads are reduced by a factor of one-half. More particularly, to reduce the tape consumption and thereby increase the recording time on magnetic tape 4, the 2:1:1 system is utilized in which the speed of movement of magnetic tape 4 and the speed of rotation of the rotary magnetic heads $H_R$ are one-half those of the magnetic tape and rotary magnetic heads in the 4:2:2 system. At such time, the sampling frequency of the color video signal and operating frequency of the encoders are reduced by one-half in a similar manner. In like manner, during reproduction when the tape speed and speed of rotation of the rotary magnetic heads $H_P$ are reduced by a factor equal to one-half, the apparatus is changed over from the 4:2:2 system to the 2:1:1 system. It is to be appreciated that, for a change in the recording section from the 4:2:2 system to the 2:1:1 system, the sampling frequency of the digital color video signal and the operating frequency of the encoders are is changed from $8f_0$ to $4f_0$. In this manner, all of switches $SW_1$–$SW_4$ have their movable arms a changed over to terminals c to operate in the 2:1:1 system. A similar operation occurs with respect to switches SW$_5$–SW$_8$ when changing from the 4:2:2 to 2:1:1 system.

Figure 3:
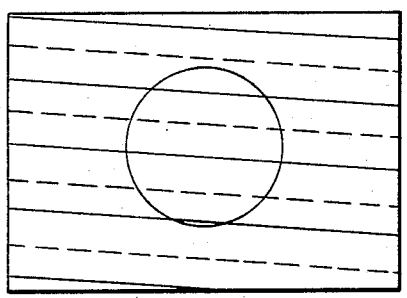
FIG. 3 is a schematic diagram of a raster produced in response to a video signal which has been recorded and reproduced by a 4:2:2 hierarchy system.
Figure 4:
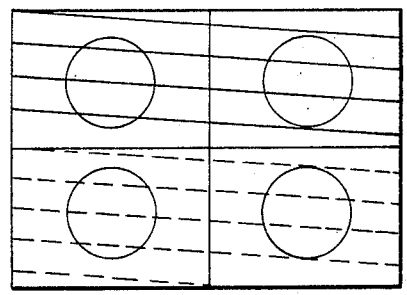
FIG. 4 is a schematic diagram of a raster produced in response to a video signal recorded by a 2:1:1 hierarchy system and reproduced by a 4:2:2 hierarchy system.
Figure 5:
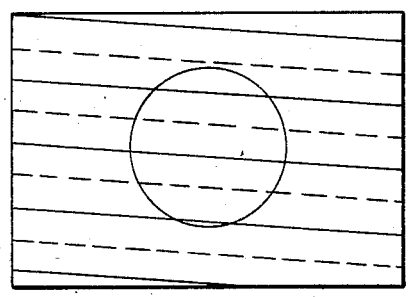
FIG. 5 is a schematic diagram of a raster produced in response to a video signal which has been recorded and reproduced by a 2:1:1 hierarchy system.
Figure 6:
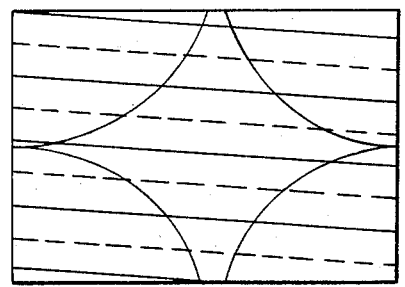
FIG. 6 is a schematic diagram of a raster produced in response to a video signal recorded by a 4:2:2 hierarchy system and reproduced by a 2:1:1 hierarchy system.

It is to be appreciated that the above arrangement has been discussed only with respect to changing over the recording and reproducing sections with the same sampling frequency. It may be desirable, however, to reproduce with a sampling frequency which is different than that used for recording. For example, for the raster shown in FIG. 3, if the video signal thereof is recorded in the 4:2:2 system and then reproduced in the 4:2:2, the reproduced picture image of the circle is the same as that recorded. However, when the same video signal is recorded in the 2:1:1 system and then reproduced in the 4:2:2 system, the picture is divided into four equal quadrant pictures, that is, four smaller circles are reproduced, as shown in FIG. 4. This is because each frame of the reproduced video signal corresponds to two frames of the video signal that had been recorded. In like manner, when the video signal of the circle is recorded in the 2:1:1 system and then reproduced in the same 2:1:1 system, as shown in FIG. 5, the picture image of the circle remains the same. On the other hand, if the video signal is reproduced in the 2:1:1 system and recorded in the 4:2:2 system, since one frame of the reproduced picture image corresponds to one field of the original image, the reproduced picture image is reproduced as shown in FIG. 6. It is to be appreciated, however, that if a digital information signal having sampling frequency $N_i$ is encoded and then decoded at a different frequency $N_j$ time base compression of the digital information signal with the ratio $N_j/N_i$ is possible.

The present invention provides compatibility between the 4:2:2 system and the 2:1:1 system by providing that the speed of movement of magnetic tape 4 during recording, the speed of rotation of the recording rotary magnetic heads $H_R$ and the operating frequency of encoders 34 and 36 are varied with the same integer ratio $\alpha$, such that the sampling frequency of the signal to be recorded varies with the same ratio $\alpha$, while the speed of movement of magnetic tape 4 during reproduction, the speed of rotation of reproducing magnetic heads $H_P$ and the operating frequency of decoders 42 and 44 are varied with the same integer ratio $\beta$ such that the sampling frequency of the reproduced signal varies with the same ratio $\beta$. For example, if, upon recording, the speed of movement of magnetic tape 4 and speed of rotation of rotary magnetic heads $H_R$ remain the same in the 4:2:2 system, whereby the operating frequency of encoders 34 and 36 remain the same and the sampling frequency of the color video signal remains the same, the ratio $\alpha$ equals one. On the other hand, if recording occurs at a slower rate, for example, in the 2:1:1 system, such that the speed of movement of magnetic tape 4 is reduced by one-half, the speed of rotation of rotary magnetic heads $H_R$ is reduced by one-half and the operating frequency of encoders 34 and 36 is reduced by one-half, sampling of the color video signal is likewise controlled so that the sampling frequency thereof is also reduced by one-half, and the ratio $\alpha$ equals one-half.

In order to control the above-described operation, a control circuit 60 is provided, as shown in FIG. 2, for controlling the speed of rotation of rotary magnetic heads $H_R$ and $H_P$, capstan 10 which, in turn, controls the speed of movement of magnetic tape 4, and switches SW$_4$ and SW$_8$ to selectively supply clock signals to encoders 34 and 36 and decoders 42 and 44. The control lines are shown as dashed lines in FIG. 2. More particularly, control circuit 60 controls the recording section such that the speed of rotation of rotary magnetic heads $H_R$, the speed of movement of magnetic tape 4 and the operating frequency of encoders 34 and 36 change with the same ratio $\alpha$, and thereby result in the sampling frequency of the digital color video signal from multiplexer 32 also changing with the same ratio $\alpha$, that is, through control of ganged switches SW$_1$–SW$_3$. The same holds true for the reproducing section, namely, that the speed of rotation of rotary magnetic heads $H_P$, the speed of movement of magnetic tape 4 and the operating frequency of decoders 42 and 44 are controlled to change with the same ratio $\beta$, and thereby result in the sampling frequency of the digital color video supplied to demultiplexer also changing with the same ratio $\beta$. In this manner, change of the apparatus between different hierarchy sampling frequencies can be effected during recording and/or reproduction.

It is to be appreciated that, although the present invention has been described only with respect to the 4:2:2 system and the 2:1:1 system, it is possible to use other systems with the present invention, such as the 4:4:4 system or 3:1:1 system, in addition to or in substitution of the aforementioned systems. In the case of the 4:4:4 system, the operating frequency, the speed of movement of magnetic tape 4 and the speed of rotation of the magnetic heads are 3 times those for the 2:1:1 system. With the 3:1:1 system, the operating frequency, speed of movement of the magnetic tape 4 and speed of rotation of the rotary magnetic heads are similar to those of the 2:1:1 system. However, for the 3:1:1 system, the red color difference signal (R - Y) component and blue color difference signal (B - Y) component are transmitted in a time sharing manner.

Generally speaking, the present invention can be used with any number of hierarchy sampling frequencies, that is, having a relationship 1:$N_1$:$N_2$:$N_3$:$N_4$: . . . :$N_m$. For example $N_1$ may be equal to 4 corresponding to the 2:1:1 system, $N_2$ may be equal to 5 corresponding to the 3:1:1 system, $N_3$ may be equal to 8 corresponding to the 4:2:2 system and $N_4$ may be equal to 12 corresponding to the 4:4:4 system. It is to be appreciated that the amount of information in the digital information signal corresponds to the sampling frequency of the signal with the same relationship 1:$N_1$:$N_2$:$N_3$:$N_4$: . . . :$N_m$. Further, since the digital information signal is divided into data blocks, it is to be appreciated that each data block during recording includes information in the same relationship but varied by a proportional constant K, that is, K:K$N_1$:K$N_2$:K$N_3$:K$N_4$: . . . :K$N_m$. A similar proportionality constant L applies during reproduction.

It is to be appreciated that various modifications can be made to the present invention by one of ordinary skill in the art within the scope of the claims herein. For example, although the present invention has been described principally with respect to a digitized color video signal, the present invention can operate with respect to other digitized information signals, such as a combined digital audio and video signal or merely a digital audio signal by itself. Further, although switches SW$_1$–SW$_8$ have been shown as single-pole, double-throw switches, these switches may be replaced by semiconductor devices.

Having described a specific preferred embodiment of the invention with reference to the accompanying drawings, it is to be understood that the present invention is not limited to that precise embodiment and that various changes and modifications may be effected therein by one skilled in the art without departing from the scope or spirit of the invention as defined in the appended claims.

What is claimed is:

1. Apparatus for recording and reproducing an information signal on a record medium, comprising:
   drive means for moving said record medium at selected speeds during a recording operation and a reproducing operation, respectively;
   a recording section including;
   recording converting means for converting an input information signal into a digital information signal having n digital signal components, $n \geq 2$, each said digital signal component being converted at a respective component recording sampling frequency such that said digital information signal has a recording sampling frequency equal to the sum of the component recording sampling frequencies;
   recording processing means for processing said digital information signal at a selected recording operating frequency; and
   recording transducer means moveable at a selected speed for recording said processed digital information signal on said record medium as the latter is moved during said recording operation by said drive means;
   a reproducing section including;
   reproducing transducer means moveable at a selected speed for reproducing said processed digital information signal from said record medium as the latter is moved during said reproducing operation by said drive means;
   reproducing processing means for processing said reproduced processed digital information signal at a selected reproducing operating frequency to produce a reproduced digital information signal having n reproduced digital signal components; and
   reproducing converting means for converting said reproduced digital information signal from said reproducing processing means into analog form, said n reproduced digital signal components being converted at respective component reproducing sampling frequencies such that said reproduced digital information signal is converted at a reproducing sampling frequency equal to the sum of said component reproducing sampling frequencies; and
   control means responsive to said recording sampling frequency to establish a value $\alpha$, and responsive to said reproducing sampling frequency to establish a value $\beta$;
   said control means selecting the speed of said recording transducer, the speed of said record medium and said recording operating frequency during said recording operation in proportion to said value $\alpha$, and selecting the speed of said reproducing transducer, the speed of said record medium and said reproducing operating frequency during said reproducing operation in proportion to said value $\beta$.

2. Apparatus according to claim 1; in which said control means includes clock signal generating means for generating a plurality of clock signals having different frequencies, first switch means receiving said clock signals and a control circuit for controlling said first switch means to selectively supply selected ones of said clock signals to said recording processing means such that said recording operating frequency changes in proportion to said value $\alpha$, and said control means further includes second switch means receiving said clock signals, said control circuit controlling said second switch means to selectively supply selected ones of said clock signals to said reproducing processing means such that said reproducing operating frequency changes in proportion to said value $\beta$.

3. Apparatus according to claim 2; in which said control means further includes third switch means receiving said clock signals, said control circuit controlling said third switch means to selectively supply selected ones of said clock signals to said recording converting means such that said recording sampling frequency changes in proportion to said value $\alpha$, and
   said control means further includes fourth switch means receiving said clock signals, said control circuit controlling said fourth switch means to selectively supply selected ones of said clock signals to said reproducing converting means such that said reproducing sampling frequency changes in proportion to said value $\beta$.

4. Apparatus according to claim 3; in which said input information signal includes n information components; said recording converting means converts said n information components into corresponding ones of said n digital signal components with said component recording sampling frequencies equal to $A_1 f_0 \ldots A_n f_0$, respectively, where $f_0$ is a predetermined frequency and $A_1 \ldots A_n$ are integer values; and said third switch means includes n switches for selectively supplying different ones of said clock signals having frequencies equal to said component recording sampling frequencies $A_1 f_0 \ldots A_n f_0$ to said recording converting means.

5. Apparatus according to claim 4; in which said input information signal is a color video signal having a luminance component, a red color difference signal component and a blue color difference signal component; said third switch means includes first, second and third switches; and said recording converting means includes first, second and third analog-to-digital converting means supplied with clock signals from said first, second and third switches, respectively, for converting said luminance component, said red color difference signal component and said blue color difference component, respectively, into said corresponding ones of said n digital signal components.

6. Apparatus according to claim 5; in which said clock signals switched by said first, second and third switches to said first, second and third analog-to-digital converting means have respective frequencies with one of the following relationships: 4:2:2, 2:1:1, 4:4:4 and 3:1:1.

7. Apparatus according to claim 4; in which said first and third switch means are ganged together.

8. Apparatus according to claim 4; in which said reproducing converting means converts said n reproduced digital signal components into analog form with component reproducing sampling frequencies $B_1 f_0 \ldots B_n f_0$, respectively where $B_1 \ldots B_n$ are integer values; and said fourth switch means includes n switches for selectively supplying different ones of said clock signals having frequencies equal to said component reproducing frequencies $B_1 f_0 \ldots B_n f_0$ to said reproducing converting means.

9. Apparatus according to claim 8; in which said reproduced digital information signal is a color video signal having a luminance component, a red color difference signal component and a blue color difference signal component; said fourth switch means includes first, second and third switches; and said reproducing converting means includes first, second and third digital-to-analog converting means supplied with clock signals from said first, second and third switches, respectively, for converting said luminance component, said red color difference signal component and said blue color difference signal component, respectively, into analog form.

10. Apparatus according to claim 9; in which said clock signals switched by said first, second and third switches to said first, second and third digital-to-analog converting means have respective frequencies with one of the following relationships: 4:2:2, 2:1:1, 4:4:4 and 3:1:1.

11. Apparatus according to claim 8; in; which said third and fourth switch means are ganged together.

12. Apparatus according to claim 8; in which n equals three and said component recording sampling frequencies have one of the following relationships: 4:2:2 and 2:1:1.

13. Apparatus according to claim 12; in which said component reproducing sampling frequencies have one of the following relationships: 4:2:2: and 2:1:1.

14. Apparatus according to claim 1; in which said recording processing means includes encoder means for encoding said digital information signal at said recording operating frequency.

15. Apparatus according to claim 1; in which said reproducing processing means includes decoder means for decoding said reproduced processed digital information signal at said reproducing operating frequency.

16. Apparatus for recording and reproducing an information signal on a record medium, comprising:
drive means for moving said record medium at selected speeds during a recording operation and a reproducing operation, respectively;
a recording section including;
  recording converting means for converting an input information signal into a digital information signal having n digital signal components, $n \geq 2$, each said digital signal component being converted at a respective component recording sampling frequency such that said digital information signal has a recording sampling frequency equal to the sum of the component recording sampling frequencies;
  recording processing means for processing said digital information signal at a selected recording operating frequency; and
  recording transducer means moveable at a selected speed for recording said processed digital information signal on said record medium as the latter is moved during said recording operation by said drive means;
a reproducing section including;
  reproducing transducer means moveable at a selected speed for reproducing said processed digital information signal from said record medium as the latter is moved during said reproducing operation by said drive means;
  reproducing processing means for processing said reproduced processed digital information signal at a selected reproducing operating frequency to produce a reproduced digital information signal having n reproduced digital signal components; and
  reproducing converting means for converting said reproduced digital information signal from said reproducing processing means into analog form, said n reproduced digital signal components being converted at respective component reproducing sampling frequencies such that said reproduced digital information signal is converted at a reproducing sampling frequency equal to the sum of said component reproducing sampling frequencies; and
control means for selecting the speed of said recording transducer, the speed of said record medium and said recording operating frequency during said recording operation in accordance with a selected ratio $\alpha$, and for selecting the speed of said reproducing transducer, the speed of said record medium and said reproducing operating frequency during said reproducing operation in accordance with a selected ratio $\alpha$, said recording sampling frequency of said digital information signal and said reproducing sampling frequency of said reproduced digital information signal being varied as $\alpha$ and $\beta$ respectively.

* * * * *